United States Patent

Fujiyama et al.

[11] Patent Number: 5,865,076
[45] Date of Patent: Feb. 2, 1999

[54] CLUTCH MECHANISM FOR SCREW TIGHTENING MACHINE

[75] Inventors: Takeo Fujiyama; Nobuo Moteki, both of Tokyo, Japan

[73] Assignee: Max Co., Ltd., Tokyo, Japan

[21] Appl. No.: 892,430

[22] Filed: Jul. 14, 1997

Related U.S. Application Data

[63] Continuation of Ser. No. 580,375, Dec. 28, 1995, abandoned.

[30] Foreign Application Priority Data

Dec. 28, 1994 [JP] Japan ................................ 6-340410

[51] Int. Cl.$^6$ .................................................. B25B 23/157
[52] U.S. Cl. ................................................. 81/474; 192/56
[58] Field of Search ........................... 81/467, 473, 474; 192/56

[56] References Cited

U.S. PATENT DOCUMENTS 2,167,749  8/1939  Grohn ...................................... 192/56

FOREIGN PATENT DOCUMENTS

| 0 195 853 | 10/1986 | European Pat. Off. . |
| 0 359 992 | 3/1990 | European Pat. Off. . |
| 0 666 145 | 8/1995 | European Pat. Off. . |
| 38 18 924 | 6/1989 | Germany . |
| 43 33 599 | 4/1994 | Germany . |

*Primary Examiner*—James G. Smith
*Attorney, Agent, or Firm*—Morgan, Lewis & Bockius LLP

[57] ABSTRACT

A clutch mechanism for a screw tightening machine having a clutchment and a main shaft, the clutchment interlocking with a screw tightening machine driving mechanism, the main shaft holding a screw tightening driver bit, the clutchment and the main shaft opposing each other along the center of the driver bit with the main shaft being urged with a spring to move away from the clutchment, so that the main shaft is engaged with or released from the clutchment, the clutch mechanism includes: a plurality of first clutch claws around the circumference subtending the center of the shaft, the first clutch claws being projecting on an end of the main shaft; second clutch claws meshable with the first clutch claws, the second clutch claws being arranged on the clutchment to make a predetermined amount of pivotting about an axis from such a position as to squarely oppose the first clutch claws, the axis being perpendicular to the center of the shaft, the second clutch claws being always urged in the squarely opposed position, wherein the clutchment is engaged with the main shaft by having the first clutch claws meshed with the second clutch claws, and the clutchment is released from the main shaft by causing the first clutch claws to move away from the second clutch claws.

6 Claims, 5 Drawing Sheets

CONVENTIONAL ART

CLUTCH MECHANISM FOR SCREW TIGHTENING MACHINE

This is a continuation of application Ser. No. 08/580,375, filed on Dec. 28, 1995, which was abandoned upon the filing hereof.

BACKGROUND OF THE INVENTION

The invention relates to a clutch mechanism for a screw tightening machine in which improvement is made to prevent noise and reduce shock at the time the clutch is engaged and released.

As shown in FIGS. 9(a) and 9(b), a clutch mechanism for a screw tightening machine such as an electric screwdriver of this type is generally constructed so that trapezoidal clutch claws 30 are formed on the surface of a screw tightening machine main body a and the surface of a driver bit b, both surfaces opposing each other. These clutch claws 30 are meshed with each other so that the clutch mechanism is engaged to transmit motive power and are disengaged from each other so that the clutch mechanism is released to stop the transmission of the motive power.

Each clutch claw 30 has such a section as shown in FIG. 9(b). That is, the mating surfaces are sloped. Therefore, to maintain the meshed condition, the screw tightening machine main body must be urged in the screwing direction.

However, the conventional clutch mechanism has following difficulties. That is, if, e.g., a poor scaffolding does not allow the operator to continuously apply strong urging load to the screw tightening machine and the clutch claws are therefore disengaged from each other in the course of screw tightening operation, then the clutch claws collide against each other to make noise continuously or to wear the corners of the clutch claws. Moreover, when the clutch engaging operation alternates with the clutch releasing operation, shock against the screw tightening machine before and after such operations increases, thereby impairing operating and handling ease.

SUMMARY OF THE INVENTION

The object of the invention is to overcome the aforementioned difficulties. That is, the object of the invention is to provide a clutch mechanism for a screw tightening machine that can prevent noise during screw tightening operation and reduce shock at the time the first clutch claws mesh with the second clutch claws by allowing the second clutch claws to turn.

To achieve the above object, a first aspect of the invention is applied to a clutch mechanism for a screw tightening machine having a clutchment and a main shaft, the clutchment interlocking with a screw tightening machine driving mechanism, the main shaft holding a screw tightening driver bit, the clutchment and the main shaft opposing each other along the center of the driver bit with the main shaft being urged with a spring to move away from the clutchment, so that the main shaft is engaged with or released from the clutchment, the clutch mechanism includes: a plurality of first clutch claws around the circumference subtending the center of the shaft, the first clutch claws being projecting on an end of the main shaft; second clutch claws meshable with the first clutch claws, the second clutch claws being arranged on the clutchment to make a predetermined amount of pivotting about an axis from such a position as to squarely oppose the first clutch claws, the axis being perpendicular to the center of the shaft, the second clutch claws being always urged in the squarely opposed position, wherein the clutchment is engaged with the main shaft by having the first clutch claws meshed with the second clutch claws, and the clutchment is released from the main shaft by causing the first clutch claws to move away from the second clutch claws.

To overcome the above object, a second aspect of the invention is applied to a clutch mechanism for a screw tightening machine according to the first aspect, further including: a clutch plate arranged to overlap on an end surface of the clutchment opposing the main shaft, said clutch plate having notches for allowing said second clutch claws to project therefrom, wherein all said second clutch claws are turned in synchronism with the turning of said clutch plate.

To achieve the above object, a third aspect of the invention is applied to a clutch mechanism for a screw tightening machine according to the first aspect, in which the first clutch claws are arranged on the clutchment and the second clutch claws are arranged on the main shaft.

According to the first aspect of the invention, the first clutch claws mesh with the second clutch claws when the main shaft is moved toward the clutchment against the pressure of the spring with the tip of the driver bit biased onto the member to be screwed together with the screw. As a result, the clutch is engaged, thereby allowing the screw to be twisted into the member to be screwed from the front end of the nose portion while causing the screw to be turned in synchronism with the turning of the driver bit. Since the second clutch claws are set in an inclined position by turning after the engagement, shock generated at the time the first clutch claws mesh with the second clutch claws can be reduced.

Further, when the main shaft moves in a direction opposite to the clutchment when the screw tightening operation has been terminated, the first clutch claws slide along the mating surfaces of the second clutch claws and thereby move away from the corner portions of the second clutch claws. As a result, the clutch is released. Simultaneously therewith, the second clutch claws are urged in the opposite direction to be turned to erect in the squarely opposed position from the inclined position. Since the front end of each second clutch claw is projected, the amount of projection of the front end surface after the erection becomes smaller than the amount of projection of the corner portion at the time the first clutch claw moves away. Therefore, a clearance is produced between the first clutch claw and the second clutch claw almost simultaneously with the moving away of the first clutch claw from the second clutch claw.

Since the moving away of the first clutch claw from the second clutch claw simultaneously produces the clearance therebetween, noise is never made continuously due to the clutch claws colliding against each other, nor the corner portions of the clutch claws wear. Further, since there is no shock generated by the clutch claws colliding against the screw tightening machine, the operating and handling ease of the screw tightening machine will not be impaired.

It may be noted that when the meshing of a single pair of first and second clutch claws not only causes the clutchment to turn but also causes the clutch plate to turn simultaneously therewith according to the second aspect of the invention. The turning of the clutch plate causes all the second clutch claws to be meshed with the corresponding first clutch claws. As a result, the meshing of a single pair of clutch claws causes all the other pairs of clutch claws to be meshed simultaneously, which in turn allows the main shaft to be turned without fail.

Further, advantages similar to the above can be obtained also by the third aspect of the invention.

DETAILED DESCRIPTION OF THE PREFERRED EMBODIMENTS

Figure 1:
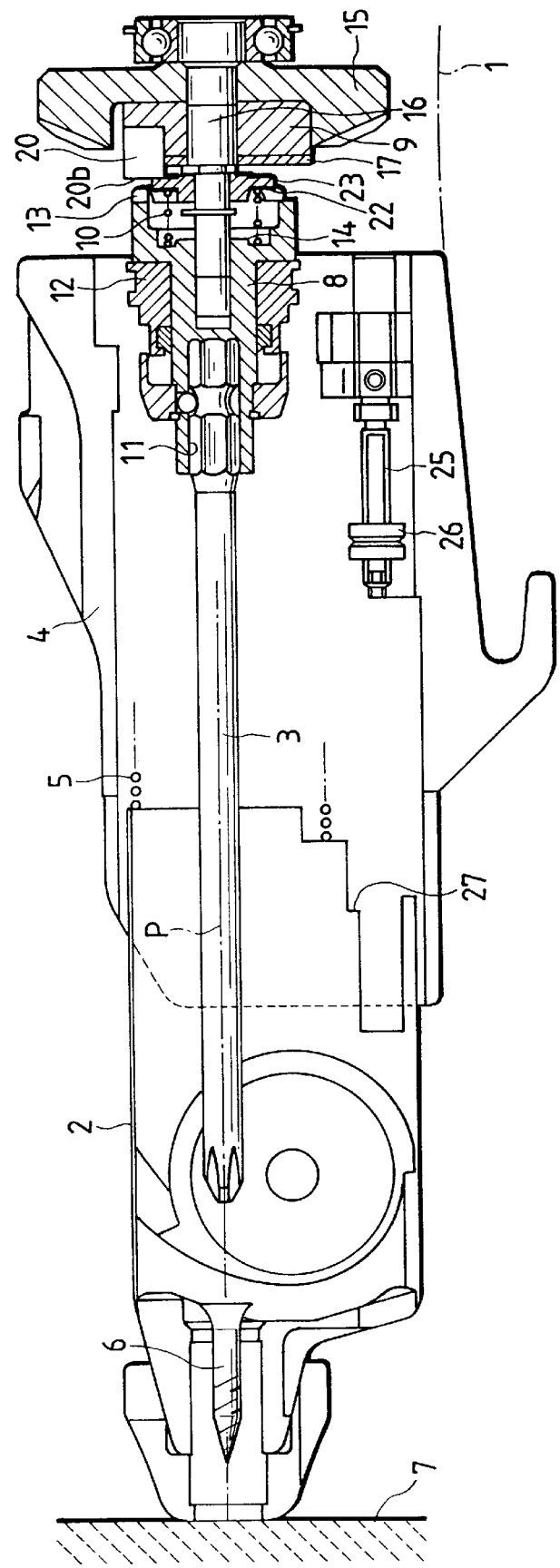
FIG. 1 is a longitudinal sectional view showing a main portion of a screw tightening machine having a clutch mechanism of the invention.

FIG. 1 is a longitudinal sectional view of a screw tightening machine. In FIG. 1, reference numeral 1 denotes a screw tightening machine main body; and 2, a nose portion. Inside the screw tightening machine main body 1 are a driver bit 3 for tightening screws and a driver bit driving mechanism (not shown). The nose portion 2 is arranged so as to be movable in axial directions of the driver bit 3 relative to a nose holder 4 in the front of the screw tightening machine main body 1, and is always urged by a spring 5 in such a direction as to move away from the nose holder 4. A screw 6 (concatenated screw) is supplied to the front end of the nose portion 2. When the nose portion 2 is moved back while biased onto a member 7 to be screwed with the driver bit 3 being rotated by the driving mechanism, the driver bit 3 that has moved frontward relative to the nose holder 4 projects and engages with the screw head, thereby allowing the screw 6 to be forced out of the front end of the nose portion 3 and twisted into the member 7 to be screwed while causing the screw 6 to rotate.

By the way, a clutch mechanism is interposed between the driver bit 3 and the driving mechanism. In the clutch mechanism, a main shaft 8 that holds the driver bit 3 and a clutchment 9 that interlocks with the driving mechanism are arranged so as to be slidable in axial directions P of the driver bit 3. The clutchment 9 and the main shaft 8 are opposed to each other, so that by urging the main shaft 8 in such a direction as to move away from the clutchment 9, the clutchment 9 and the main shaft 8 are connected to and disconnected from each other.

A driver bit insertion hole 11 is formed on the front side of the main shaft 8. The insertion hole 11 is polygonal in the same way as the section of the driver bit 3. As a result, the rotation of the driver bit 3 follows the rotation of the main shaft 8. Further, the main shaft 8 is rotatably guided and supported by the inner surface of a shaft guide 12 that is fixed to the screw tightening machine main body 1.

Three first clutch claws 13, each projecting, are arranged so as to extend around the circumference subtending the shaft center P on the rear end surface of the main shaft 8. Further, a recess 14 is formed in the end portion of the main shaft 8. It may be noted that the number of clutch claws is not necessarily limited to three.

Figure 2:
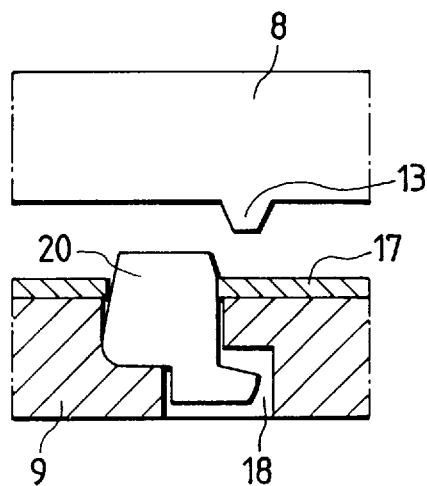
FIG. 2 is a diagram illustrative of a state in which a first clutch claw opposes a second clutch claw.
Figure 3:
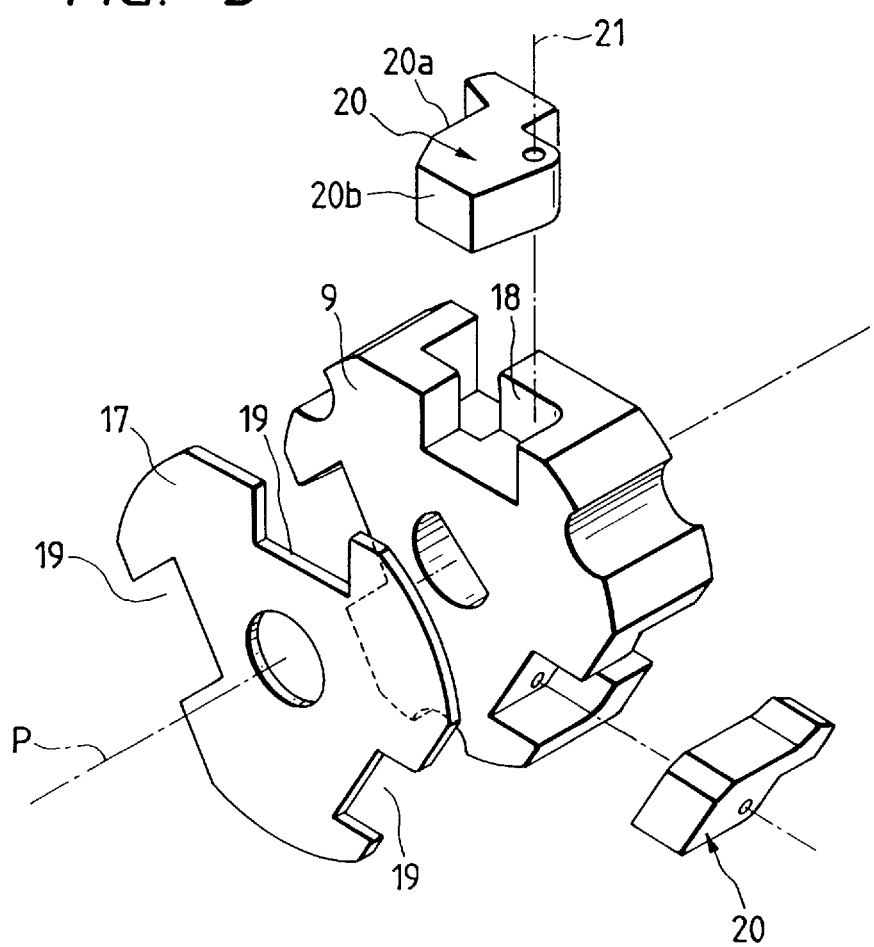
FIG. 3 is an exploded perspective view showing a clutchment, the second clutch claws, and a clutch plate.

On the other hand, the end of a gear shaft 16 of a final gear 15 (see FIG. 1) that serves as the driving mechanism is D-shaped in section. The clutchment 9 is firmly engaged with this end of the gear shaft 16. In addition, a clutch plate 17 is arranged to overlap on an end surface of the clutchment 9 opposing the main shaft 8 so as to rotatably engage with the gear shaft 16. As shown in FIGS. 2 and 3, three recesses 18 are arranged around the circumference subtending the shaft center P on the end surface of the clutchment 9 opposing the main shaft 8. The clutch plate 17 also has notches 19 corresponding to the recesses 18. Each recess 18 is Z-shaped in the direction of thickness of the clutchment 9. Second clutch claws 20 meshable with the first clutch claws 13 are arranged inside the recesses 18.

Each second clutch claw 20 is a Z-shaped platelike element. An end of the second clutch claw 20 opposing the main shaft 8 is formed large, and the top of such end projects from the corresponding notch 19 of the clutch plate 17. A surface 20a thereof meshed with the corresponding first clutch claw 13 of the main shaft 8 is sloped. Further, each second clutch claw 20 is arranged to be set in an inclined position by making a predetermined amount of turn about a turning axis 21 that is perpendicular to the shaft center P.

It may be noted that each notch 19 of the clutch plate 17 is shaped so as to interpose both sides of the corresponding second clutch claw 20 therebetween. As a result of this construction, when the clutch plate 17 turns, all the second clutch claws 20 turn simultaneously therewith and thereby mesh with the first clutch claws 13. The meshing of a pair of clutch claws leads to the meshing of another pair of clutch claws, which in turn causes the main shaft 8 to turn without fail.

Further, the turning axis 21 is the center around which the second clutch claw 20 turns; i.e., the turning axis is not necessarily a shaft. The second clutch claw 20 can turn about the turning axis 21 without the shaft.

Then, as shown in FIG. 1, a clutch guide 22 is interposed between the main shaft 8 and the clutchment 9. A clutch ring 23 is arranged to overlap on one surface of the clutch guide 22. A spring 10 is interposed between the clutch ring 23 and the bottom surface of the recess 14 of the main shaft 8, so that the main shaft 8 is always urged frontward (in such a direction as to move away from the clutchment). Further, the other surface of the clutch guide 22 is formed so as to come in contact with a front end surface 20b of the second clutch claw 20. As a result of this construction, the second clutch claw 20 is normally set in such an erect position as to squarely oppose the first clutch claw 13 as shown in FIG. 2, and the front end surface 20b is urged so as to be flush with a plane that is perpendicular to the shaft center P.

Further, an adjust rod 25 is arranged on the front end of the nose holder 4 of the screw tightening machine main body 1 so as to be slidable in the axial directions. An adjust nut 26 is screwed into the adjust rod 25. By rotating the adjust nut 26, position adjustment can be made so that the adjust nut 26 comes in contact with a rear end surface 27 of the nose portion 2 immediately before a predetermined screw tightening depth is reached.

Figure 4:
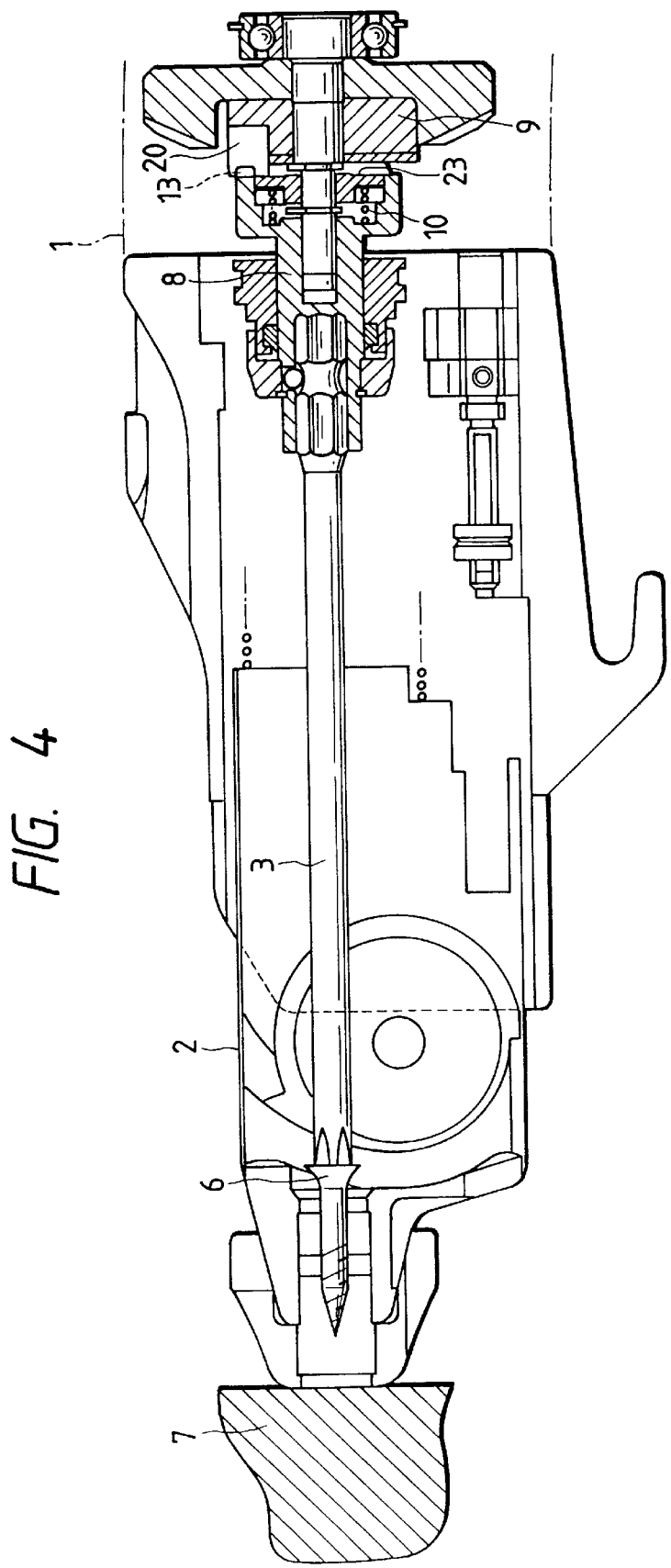
FIG. 4 is a longitudinal sectional view showing how the clutch mechanism is operated at an initial stage of screw tightening operation.
Figure 5:
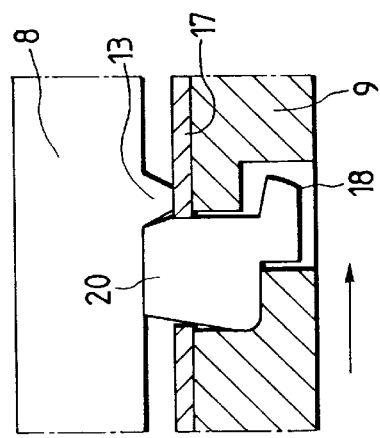
FIG. 5 is a diagram illustrative of a state in which the first clutch claw starts engaging with the second clutch claw.

The mode of operation of the thus constructed screw tightening machine will be described next. Normally, the spring 5 is in the expanded condition, so that the main shaft 8 is remote from the clutchment 9 as shown in FIG. 1. For tightening a screw 6 supplied to the nose portion 2, the driving mechanism is actuated to move the front end of the nose portion 2 back by biasing the nose portion 2 onto the member 7 to be screwed as shown in FIG. 4. Then, the tip of the driver bit 3 soon engages with the head of the screw 6. When the nose portion 2 is further pushed under such condition, the first clutch claws 13 on the end surface of the main shaft 8 mesh with the second clutch claws 20 of the clutchment 9 against the pressure of the spring 5 as shown in FIG. 5 to thereby allow the clutch mechanism to engage. As a result, the torque of the driving mechanism is transmitted to the main shaft 8 to rotate the main shaft 8, so that the driver bit 3 is rotated to cause the screw 6 to rotate and be twisted into the member 7 to be screwed with the screw 6 being forced out of the front end of the nose portion 2.

Figure 6:
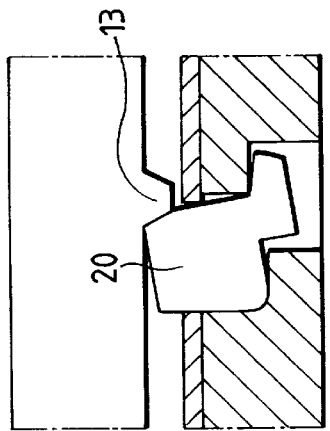
FIG. 6 is a diagram illustrative of a state in which the first clutch claw is in engagement with the second clutch claw.

By the way, when the first clutch claw 13 meshes with the corresponding second clutch claw 20, a load is applied to the second clutch claw 20. As a result, each second clutch claw 20 turns about the turning axis 21 to be set in the inclined position from the squarely opposing position as shown in FIG. 6. The second clutch claw 20 comes in contact with the clutch guide 22 and is set in the squarely opposed position while urged by the spring 10. Therefore, it is when the second clutch claw 20 turns to be set in the inclined position that shock generated at the time the first clutch claw 13 meshes with the second clutch claw 20 is reduced by such urging of the spring 10, because the urging of the spring 20 is effective for the turning of the second clutch claw 20. When a single second clutch claw 20 is set in the inclined position, the clutch plate 17 also turns so as to follow the operation of the second clutch claw 20, which in turn allows other second clutch claws 20 to turn simultaneously to be set in the inclined position.

Figure 7:
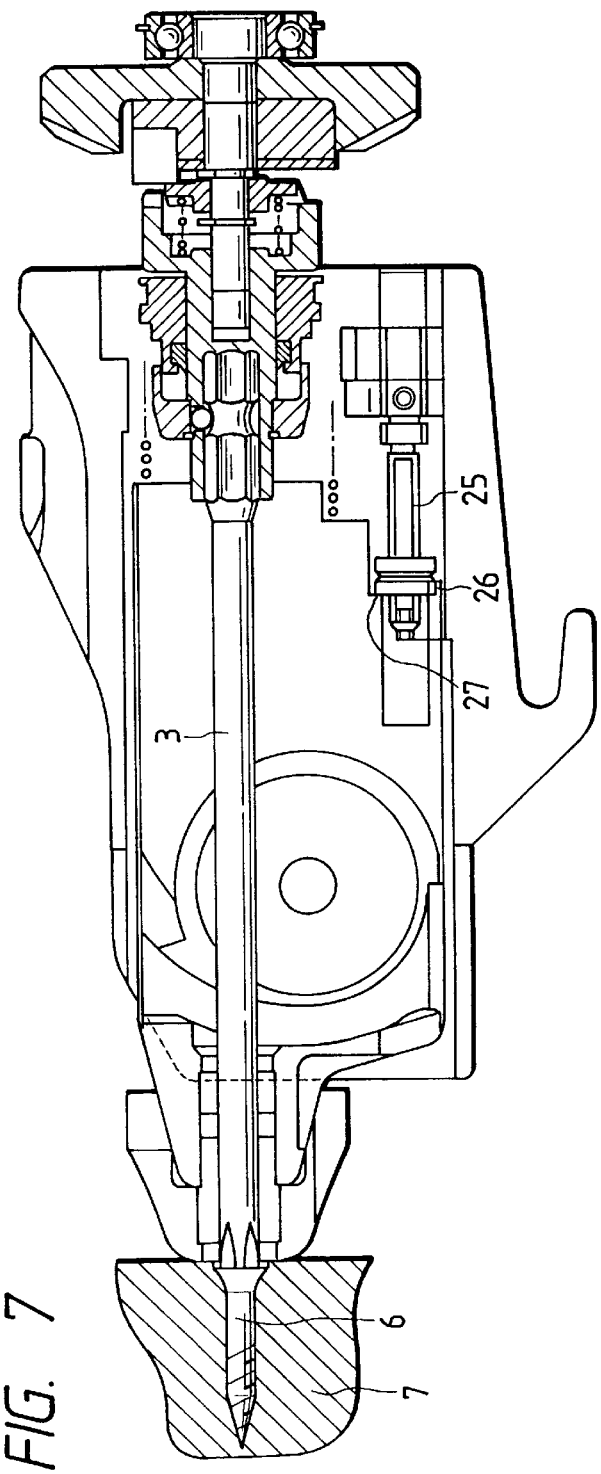
FIG. 7 is a diagram illustrative of screw tightening operation.

The rear end surface of the nose portion 2 comes in contact with the adjust nut 26 immediately before reaching the predetermined screw tightening depth as shown in FIG. 7. Since the main shaft 8 advances by screwing thereafter, the clutch is released through the disengagement of the first clutch claw 13 from the second clutch claw 20 again as shown in FIGS. 1 and 2, thereby terminating the screw tightening operation.

Figure 8:
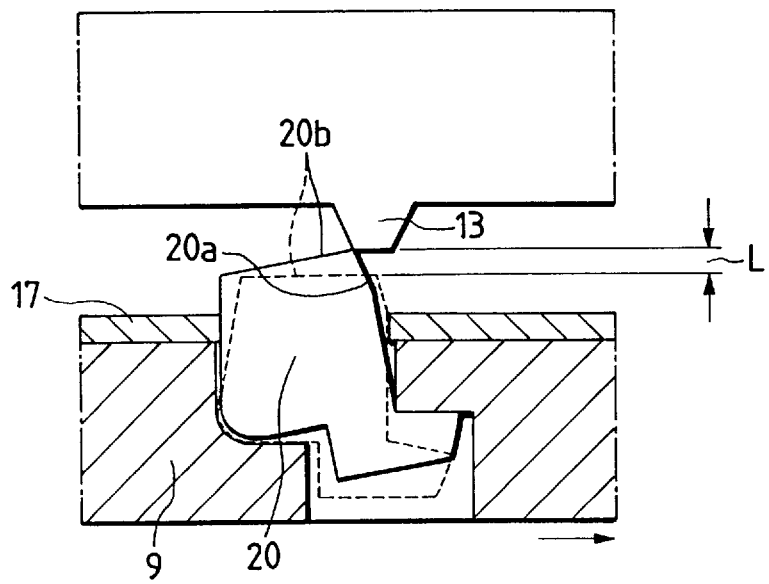
FIG. 8 is a diagram illustrative of a state in which the first clutch claw meshes with and moves away from the second clutch claw.
Figure 9A:
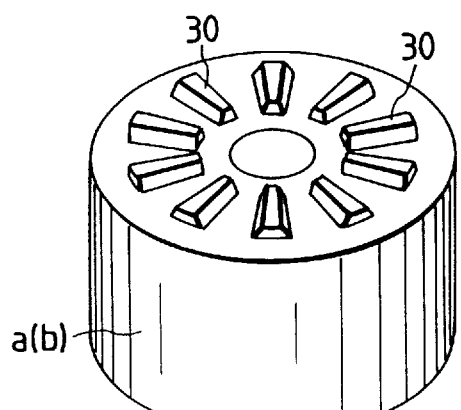
FIGS. 9(a) and 9(b) are diagrams illustrative of the operation of a conventional clutch mechanism.
Figure 9B:
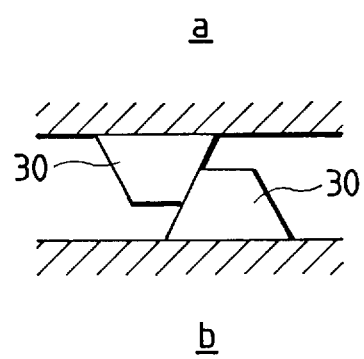

At the time the screw tightening operation is terminated, the clutch is released by causing the first clutch claw 13 to slide along the mating surface 20a of the second clutch claw 20 and thereby allowing the first clutch claw 13 to move away from the corner at which the mating surface 20a meets the front end surface 20b of the second clutch claw 20 as shown in FIG. 8. Simultaneously therewith, the second clutch claw 20 is caused to make a turn in the opposite direction by the clutch guide 22 urged by the spring 10 and thereby returns to erect in the squarely opposed position. Since the front end of the second clutch claw 20 is projected, the amount of projection of the front end surface 20b after the erection becomes smaller than the amount of projection of the corner at the time the front end surface 20b moves away. Therefore, a clearance L is produced between the first clutch claw 13 and the second clutch claw 20 almost simultaneously with the moving away of the first clutch claw 13. Hence, noise is in no way made continuously by the clutch claws 13, 20 colliding against each other, nor the corners of the clutch claws wear. Furthermore, there is no shock generated by the clutch claws colliding against the screw tightening machine, which in turn prevents the operating and handling ease of the screw tightening machine from being impaired.

Still further, even if the clutch is released in the course of screw tightening operation with the urging load against the screw tightening machine being reduced due to poor scaffolding, no noise is made for the same reason.

It may be noted that the first clutch claws can be arranged on the clutchment and that the second clutch claws can be arranged on the main shaft.

What is claimed is:

1. A clutch mechanism for a screw tightening machine having a clutchment and a main shaft, the clutchment operably engaging a screw tightening driving mechanism in the screw tightening machine, the main shaft holding a screw tightening driver bit, the clutchment and the main shaft opposing each other along a center of the driver bit with the main shaft being urged with a spring to move away from the clutchment, so that the main shaft is engaged with or released from the clutchment, said clutch mechanism comprising:

a plurality of first clutch claws arranged on and projecting from an end of the main shaft;

a plurality of second clutch claws projecting from recesses in the clutchment, each of said second clutch claws having a pivot axis, said pivot axis being perpendicular to a center of the main shaft such that each of said second clutch claws may be pivoted between first and second discrete positions, said first position corresponding to when the clutchment is engaged with the main shaft by having said first clutch claws meshed with said second clutch claws thereby allowing torque to be transmitted between said first clutch claws and said second clutch claws thereby operating the screw tightening driving mechanism, and said second position corresponding to when said first clutch claws and said second clutch claws are not meshed together; and a clutch plate arranged on an end surface of the clutchment opposing said main shaft, said clutch plate having notches for allowing said second clutch claws to project therefrom, wherein all of the second clutch claws are turned in unison with the turning of the clutch plate.

2. The clutch mechanism for a screw tightening machine according to claim 1, wherein the each of the first clutch claws is generally trapezoidal in cross section.

3. The clutch mechanism for a screw tightening machine according to claim 1, wherein the each of the second clutch claws is generally Z-shaped in cross section.

4. The clutch mechanism for a screw tightening machine according to claim 1, wherein the each of the recesses in the clutchment is generally Z-shaped in cross section.

5. A clutch mechanism for a screw tightening machine having a clutchment and a main shaft, the clutchment operably engaging a screw tightening driving mechanism in the screw tightening machine, the main shaft holding a screw tightening driver bit, the clutchment and the main shaft opposing each other along a center of the driver bit with the main shaft being urged with a spring to move away from the clutchment, so that the main shaft is engaged with or released from the clutchment, said clutch mechanism comprising:

a plurality of first clutch claws arranged on and projecting from an end of the main shaft;

a plurality of second clutch claws projecting from recesses in the clutchment, each of said second clutch claws being generally Z-shaped in cross section and the recesses in the clutchment being correspondingly generally Z-shaped in cross section so as to retain said second clutch claws, said plurality of second clutch claws adapted to be meshed with said first clutch claws when the clutchment is engaged with the main shaft to thereby transmit torque between said first clutch claws and said second clutch claws, thereby operating the screw tightening driving mechanism; and a clutch plate arranged on an end surface of the clutchment opposing said main shaft, said clutch plate having notches for allowing said second clutch claws to project therefrom, wherein all of the second clutch claws are turned in unison with the turning of the clutch plate.

6. The clutch mechanism for a screw tightening machine according to claim 5, wherein each of said second clutch claws has a pivot axis, said pivot axis being perpendicular to a center of the main shaft such that each of said second clutch claws may be pivoted between first and second discrete positions, said first position corresponding to when the clutchment is engaged with the main shaft by having said first clutch claws meshed with said second clutch claws, thereby operating the screw tightening driving mechanism, and said second position corresponding to when said first clutch claws and said second clutch claws are not meshed together.

* * * * *